US011615696B2

(12) United States Patent
Basden

(10) Patent No.: US 11,615,696 B2
(45) Date of Patent: Mar. 28, 2023

(54) EMERGENCY VEHICLE NOTIFICATION SYSTEM

(71) Applicant: Julious Basden, Knightdale, NC (US)

(72) Inventor: Julious Basden, Knightdale, NC (US)

( * ) Notice: Subject to any disclaimer, the term of this patent is extended or adjusted under 35 U.S.C. 154(b) by 102 days.

(21) Appl. No.: 17/072,239

(22) Filed: Oct. 16, 2020

(65) Prior Publication Data

US 2022/0122450 A1    Apr. 21, 2022

(51) Int. Cl.
  *G08B 25/10*   (2006.01)
  *B60R 25/102*  (2013.01)
  *B60Q 7/02*    (2006.01)

(52) U.S. Cl.
  CPC .............. *G08B 25/10* (2013.01); *B60Q 7/02* (2013.01); *B60R 25/102* (2013.01)

(58) Field of Classification Search
  CPC .................................. G08B 25/10; G08G 1/07
  See application file for complete search history.

(56) References Cited

U.S. PATENT DOCUMENTS

| | | | | |
|---|---|---|---|---|
| 4,704,610 A | * | 11/1987 | Smith | G08G 1/087 340/906 |
| 8,274,563 B1 | * | 9/2012 | Bunch | B60R 25/102 348/158 |
| 8,319,662 B1 | * | 11/2012 | Bontemps | G08G 1/095 340/908 |
| 9,564,049 B2 | * | 2/2017 | Diba | G08G 1/087 |
| 2005/0167172 A1 | * | 8/2005 | Fernandez | B60L 1/00 180/65.8 |
| 2010/0262325 A1 | * | 10/2010 | Fernandez | B60L 58/30 701/22 |

* cited by examiner

*Primary Examiner* — Qutbuddin Ghulamali
(74) *Attorney, Agent, or Firm* — The Iwashko Law Firm, PLLC; Lev Ivan Gabriel Iwashko

(57) ABSTRACT

An emergency vehicle notification system, including at least one illumination device disposed on at least a portion of a traffic light to illuminate at least one illumination setting, and a control unit removably disposed within and removably connected to an emergency vehicle to change the at least one illumination setting in response to changing an operation status using an alert signal.

7 Claims, 1 Drawing Sheet

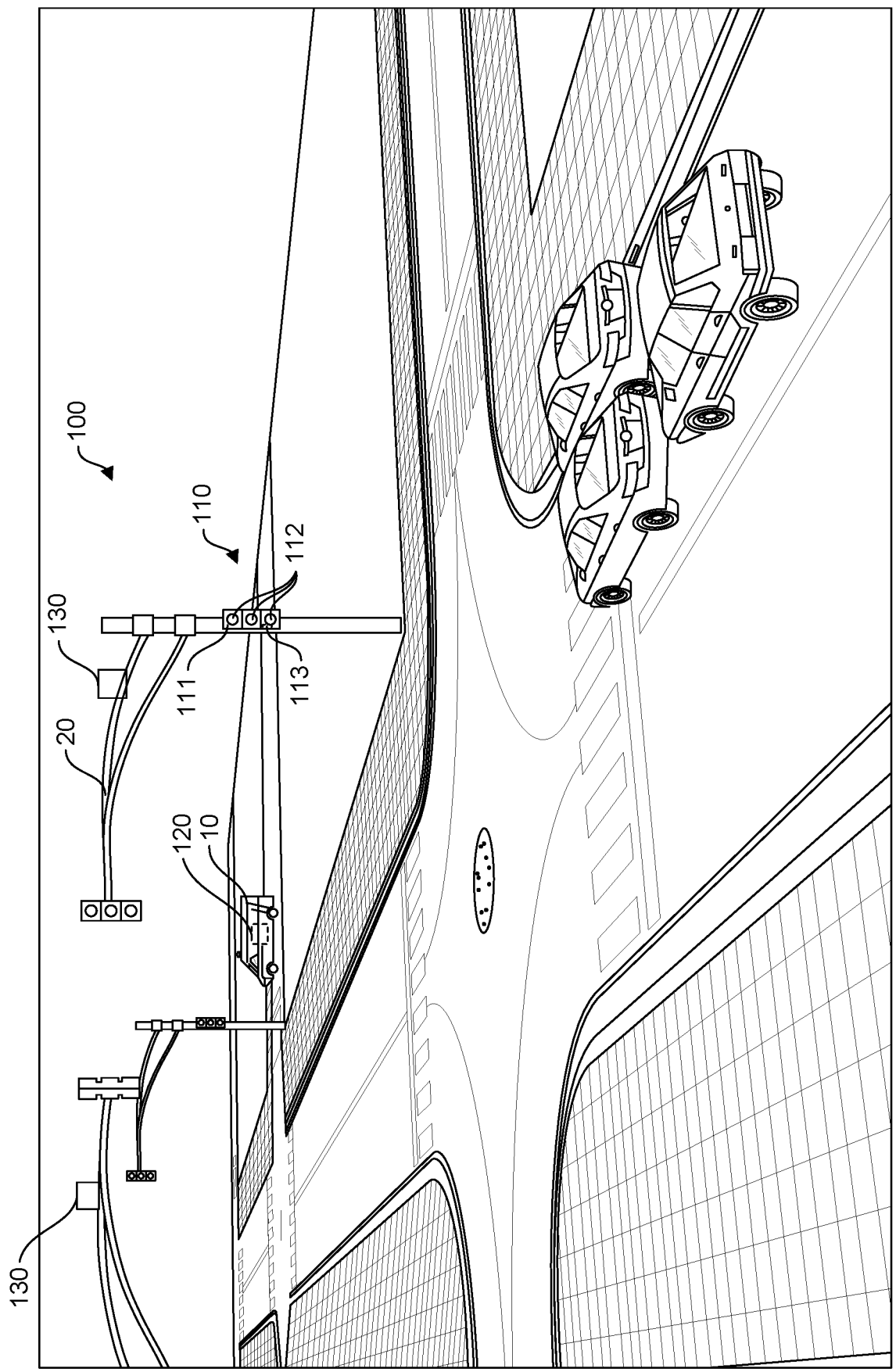

EMERGENCY VEHICLE NOTIFICATION SYSTEM

BACKGROUND

1. Field

The present general inventive concept relates generally to a notification system, and particularly, to an emergency vehicle notification system.

2. Description of the Related Art

Most people drive a vehicle as a primary means of transportation. Vehicles on the road include a combination of private, commercial, and emergency vehicles. However, for various reasons, such as traffic congestion, missed traffic signs, missed traffic lights, and/or other driving issues can lead to accidents.

For an emergency vehicle, an accident can be a dire situation during an emergency because multiple lives may be affected. Currently, the emergency vehicle relies on lights and/or sounds from the emergency vehicle to notify drivers in other vehicles to be aware of their surroundings.

Therefore, there is a need for a notification system to alert surrounding vehicles of an approaching emergency vehicle.

SUMMARY

The present general inventive concept provides an emergency vehicle notification system.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing an emergency vehicle notification system, including at least one illumination device disposed on at least a portion of a traffic light to illuminate at least one illumination setting, and a control unit removably disposed within and removably connected to an emergency vehicle to change the at least one illumination setting in response to changing an operation status using an alert signal.

The at least one illumination device may change the at least one illumination setting in response to the control unit changing the operation status from non-emergency to emergency.

The at least one illumination device may change the at least one illumination setting in response to the control unit being within a predetermined distance of the at least one illumination device.

The emergency vehicle notification system may further include at least one display unit disposed on at least a portion of the traffic light to indicate a direction from which the emergency vehicle is arriving in response to receiving the alert signal from the control unit.

The at least one display unit may indicate the direction using an illuminated directional arrow.

The at least one display unit may indicate the direction using an alarm sound.

BRIEF DESCRIPTION OF THE DRAWINGS

These and/or other features and utilities of the present generally inventive concept will become apparent and more readily appreciated from the following description of the embodiments, taken in conjunction with the accompanying drawings of which:

FIG. 1 illustrates a perspective view of an emergency vehicle notification system, according to an exemplary embodiment of the present general inventive concept.

DETAILED DESCRIPTION

Various example embodiments (a.k.a., exemplary embodiments) will now be described more fully with reference to the accompanying drawings in which some example embodiments are illustrated. In the FIGURES, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

LIST OF COMPONENTS

Emergency Vehicle Notification System 100
Illumination Device 110
Body 111
Lights 112
Transceiver 113

Control Unit 120
Display Unit 130

FIG. 1 illustrates a perspective view of an emergency vehicle notification system 100, according to an exemplary embodiment of the present general inventive concept.

The emergency vehicle notification system 100 may include at least one illumination device 110, a control unit 120, and at least one display unit 130, but is not limited thereto.

The at least one illumination device 110 may include a body 111, a plurality of lights 112, and a transceiver 113, but is not limited thereto.

The body 111 may be constructed from at least one of metal, plastic, and rubber, etc., but is not limited thereto.

Referring to FIG. 1, the body 111 is illustrated to be disposed on a traffic light 20. However, the body 111 may be disposed on a ground surface within a first predetermined distance of the traffic light 20. In other words, the body 111 may be a standalone structure.

The plurality of lights 112 may include an incandescent light and a light-emitting diode (LED), but is not limited thereto.

The plurality of lights 112 may be disposed on at least a portion of the body 111. Moreover, the plurality of lights 112 may illuminate at least one color based on an operation status using at least one illumination setting. For example, in a non-emergency status, the plurality of lights 112 may illuminate a first color (i.e. white) in at least one first illumination setting, but change to a second color (i.e. red) in at least one second illumination setting during an emergency status. Alternatively, the plurality of lights 112 may not illuminate in the at least one first illumination setting during the non-emergency status, and illuminate in the at least one second illumination setting during the emergency status. Also, the plurality of lights 112 may illuminate a steady light and/or a flashing light depending on a preference of a manufacturer.

The transceiver 113 may include a device capable of wireless or wired communication between other wireless or wired devices via at least one of Wi-Fi, Wi-Fi Direct, infrared (IR) wireless communication, satellite communication, broadcast radio communication, Microwave radio communication, Bluetooth, Bluetooth Low Energy (BLE), Zigbee, near field communication (NFC), and radio frequency (RF) communication, USB, global positioning system (GPS), Firewire, and Ethernet.

The transceiver 113 may be disposed within at least a portion of the body 111.

The control unit 120 may include an input unit, a processing unit, a communication unit, and a storage unit, but is not limited thereto.

Additionally, the control unit 120 may be considered a computing device, such as a desktop computer, a laptop computer, a tablet computer, a cell phone, a smart phone, and a personal digital assistant (PDA), but is not limited thereto.

The control unit 120 may be removably disposed within and/or removably connected to an emergency vehicle 10. The control unit 120 may receive an input to the input unit to transmit an alert signal from the communication unit to the transceiver 113, such that the plurality of lights 112 change status via the at least one illumination setting. For example, during an emergency, the emergency vehicle 10 may require an unobstructed route. As such, the control unit 120 may receive the input manually to the input unit to change the plurality of lights 112 from the non-emergency status to the emergency status. Additionally, the control unit 120 may receive the input manually to the input unit to change the plurality of lights 112 from the emergency status to the non-emergency status.

Alternatively, during the emergency, the control unit 120 may be programmed to automatically broadcast the alert signal to the transceiver 113 in response to being within a predetermined distance from the transceiver 113.

The at least one display unit 130 may include a plasma screen, an LCD screen, a light emitting diode (LED) screen, an organic LED (OLED) screen, a computer monitor, a hologram output unit, a sound outputting unit (e.g. a speaker), or any other type of device that visually or aurally displays data.

Referring again to FIG. 1, the at least one display unit 130 is illustrated to be disposed on the traffic light 20. However, the at least one display unit 130 may be disposed on the ground surface within a second predetermined distance of the traffic light 20. In other words, the at least one display unit 130 may be a standalone structure.

The at least one display unit 130 may communicate with and/or interact with another at least one display unit 130. Also, the control unit 120 may communicate with and/or control the at least one display unit 130 and/or the another display unit 130.

Furthermore, the at least one display unit 130 and/or the another display unit 130 may display an illuminated directional arrow (i.e. up, down, left, right) with respect to a position of a driver observing the at least one display unit 130 from a front view. Moreover, the at least one display unit 130 and/or the another display unit 130 may display the illuminated directional arrow in response to receiving the alert signal from the control unit 120. Also, the at least one display unit 130 and/or the another display unit 130 may display the illuminated directional arrow to indicate a direction from which the control unit 120 and/or the emergency vehicle 10 may be arriving from. As such, the at least one display unit 130 and/or the another display unit 130 may alert a surrounding area, including drivers and/or vehicles of the direction the emergency vehicle 10 is arriving from, such that the drivers may move their vehicles accordingly and/or remain stationary to prevent obstructing the emergency vehicle 10.

Alternatively, the at least one display unit 130 and/or the another display unit 130 may emit an alarm sound in response to receiving the alert signal from the control unit 120. Additionally, the at least one display unit 130 and/or the another display unit 130 may emit the alarm sound in succession, such that the drivers may be alerted to the direction the emergency vehicle 10 is arriving from, such that the drivers may move their vehicles accordingly and/or remain stationary to prevent obstructing the emergency vehicle 10.

Therefore, the emergency vehicle notification system 100 may notify the drivers of movement of the emergency vehicle 10 within a nearby area, such as near the traffic light 20. As such, the emergency vehicle notification system 100 may be highly useful to hospitals, firefighters, and other emergency responders.

The present general inventive concept may include an emergency vehicle notification system 100, including at least one illumination device 110 disposed on at least a portion of a traffic light 20 to illuminate at least one illumination setting, and a control unit 120 removably disposed within and removably connected to an emergency vehicle 10 to change the at least one illumination setting in response to changing an operation status using an alert signal.

The at least one illumination device 110 may change the at least one illumination setting in response to the control unit 120 changing the operation status from non-emergency to emergency.

The at least one illumination device 110 may change the at least one illumination setting in response to the control unit 120 being within a predetermined distance of the at least one illumination device 110.

The emergency vehicle notification system 100 may further include at least one display unit 130 disposed on at least a portion of the traffic light 20 to indicate a direction from which the emergency vehicle 10 is arriving in response to receiving the alert signal from the control unit 120.

The at least one display unit 130 may indicate the direction using an illuminated directional arrow.

The at least one display unit 130 may indicate the direction using an alarm sound.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

The invention claimed is:

1. An emergency vehicle notification system, comprising:
   at least one illumination device disposed on at least a portion of a traffic light to illuminate at least one illumination setting; and
   a control unit removably disposed within and removably connected to an emergency vehicle to change the at least one illumination setting in response to receiving a manual input to change an operation status of the at least one illumination device using an alert signal, the alert signal from the control unit further causes an alarm sound to be emitted in succession from a first location by a first display unit to a succeeding next location of a second display unit that indicates a direction from which the emergency vehicle is arriving based on succession of the alarm sound emitted by the first and second display units.

2. The emergency vehicle notification system of claim 1, wherein the at least one illumination device changes the at least one illumination setting in response to the control unit changing the operation status from non-emergency to emergency.

3. The emergency vehicle notification system of claim 1, wherein the at least one illumination device changes the at least one illumination setting in response to the control unit being within a predetermined distance of the at least one illumination device.

4. The emergency vehicle notification system of claim 1, further comprising:
   at least one display unit disposed on at least a portion of the traffic light to indicate the direction from which the emergency vehicle is arriving in response to receiving the alert signal from the control unit.

5. The emergency vehicle notification system of claim 4, wherein the at least one display unit indicates the direction using an illuminated directional arrow.

6. The emergency vehicle notification system of claim 4, wherein the at least one display unit indicates the direction using the alarm sound.

7. An emergency vehicle notification system, comprising:
   at least one illumination device disposed on at least a portion of a first traffic light to illuminate at least one illumination setting;
   a control unit removably disposed within and removably connected to an emergency vehicle to change the at least one illumination setting in response to receiving a manual input to change an operation status of the at least one illumination device using an alert signal, the alert signal from the control unit further causes an alarm sound to be emitted in succession from a first by a first display unit to a succeeding next location of a second display unit that indicates a direction from which the emergency vehicle is arriving based on succession of the alarm sound emitted by the first and second display units;
   the first display unit disposed on at least a portion of the first traffic light to emit an alarm sound that indicates a direction from which the emergency vehicle is arriving in response to receiving the alert signal from the control unit; and
   the second display unit disposed on at least a portion of a second traffic light to emit the alarm sound that indicates the direction from which the emergency vehicle is arriving in response to receiving the alert signal from the control unit, such that the second display unit is disposed a distance away from the first display unit, such that the second display unit emits the alarm sound in succession after the first display unit.

* * * * *